(12) United States Patent
Gan et al.

(10) Patent No.: US 10,496,400 B1
(45) Date of Patent: Dec. 3, 2019

(54) METHOD, APPARATUS FOR UPDATING APPLICATIONS

(71) Applicant: MOTOROLA SOLUTIONS, INC, Chicago, IL (US)

(72) Inventors: Guo Dong Gan, Kuala Lumpur (MY); Md Reduan Md Saad, Bukit Mertajam (MY); Grace Wei Wen Lim, Bukit Mertajam (MY); Kim Koon Neoh, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/049,865

(22) Filed: Jul. 31, 2018

(51) Int. Cl.
 *G06F 9/44* (2018.01)
 *G06F 8/656* (2018.01)
(52) U.S. Cl.
 CPC .................. *G06F 8/656* (2018.02)
(58) Field of Classification Search
 CPC ...................................... G06F 8/656
 USPC ................... 717/171–173, 176–178
 See application file for complete search history.

(56) References Cited

U.S. PATENT DOCUMENTS

| | | | | |
|---|---|---|---|---|
| 6,112,083 | A * | 8/2000 | Sweet | H04B 7/18545 379/203.01 |
| 7,634,286 | B2 * | 12/2009 | Dunko | H04W 4/10 455/518 |
| 8,893,110 | B2 * | 11/2014 | Kapadekar | G06F 8/65 717/171 |
| 9,332,413 | B2 | 5/2016 | Schuette et al. | |
| 9,615,251 | B2 | 4/2017 | Langguth et al. | |
| 10,257,882 | B2 * | 4/2019 | Cushing | H04W 40/02 |
| 2017/0231014 | A1 * | 8/2017 | Patel | H04W 4/10 |
| 2018/0278718 | A1 * | 9/2018 | Brown | H04W 4/08 |

FOREIGN PATENT DOCUMENTS

WO 2018124895 7/2018

* cited by examiner

*Primary Examiner* — Ted T. Vo

(57) ABSTRACT

A method and apparatus for updating applications are provided herein. During operation, an application server will determine that an application is to be updated on a device associated with a public-safety officer. The application server will then determine all members of a team which the public-safety officer is a member. The application server will then update the application on the device only when at least N members of the team have access to the application as the application is being updated (where N is an integer greater than zero).

13 Claims, 2 Drawing Sheets

METHOD, APPARATUS FOR UPDATING APPLICATIONS

BACKGROUND OF THE INVENTION

Applications and other forms of data existing on equipment operated by public-safety officers are commonly updated. During the update period, oftentimes an application/data being updated will be inaccessible to the public-safety officer.

For example, if a Push-to-Talk (PTT) application is being updated on a radio, a public-safety officer will not have the ability to communicate with the radio.

The above problem can somewhat be alleviated if a public-safety officer can call on one of their team members to access the desired application/data. For example, if Officer Fred's radio is currently unavailable because of an update, Officer Fred may use another member of their team's radio instead. Problems are encountered, however, when applications and/or data are unable to be accessed by a team as a whole because every team member's device is being updated simultaneously. This greatly diminishes the capability of the team to function efficiently as a unit.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
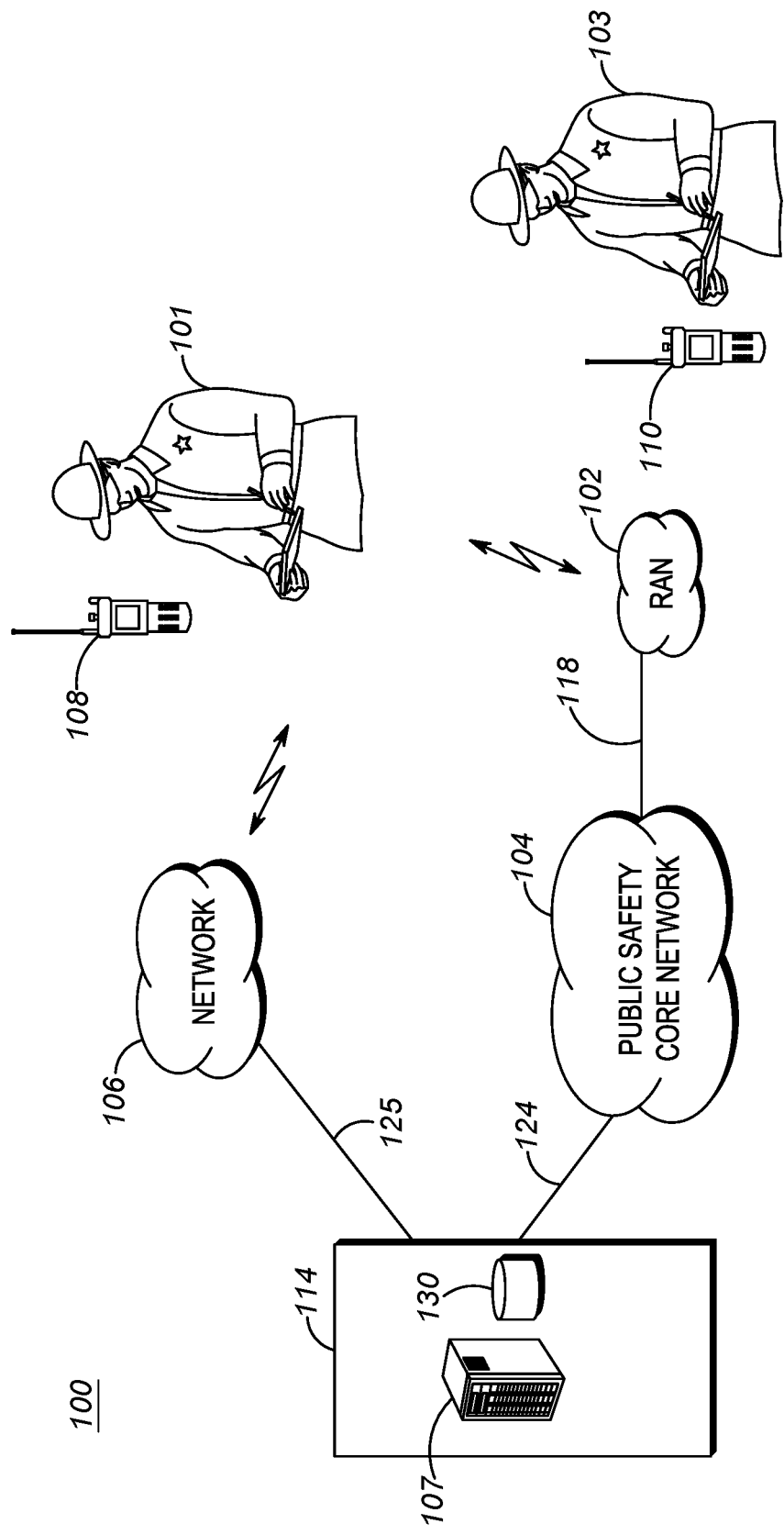
FIG. 1 shows a general operating environment for the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for updating applications/data are provided herein. During operation, an application server will determine that an application and/or data is to be updated on a device associated with a public-safety officer. The application server will then determine all members of a team which the public-safety officer is a member. The application server will then update the application and/or data on the device only when at least N members of the team have access to the application/data as the it is being updated (where N is an integer greater than zero).

In the following text, the invention will be described with regards to updating "applications". Thus, only the term "application" will be used when referring to files that need to be updated on a device. One of ordinary skill in the art will recognize that the present invention is equally applicable to any information/data that is to be updated on a device, and the term "application" is considered to cover any form of data that is to be updated as well.

As an example of the above, consider two team members patrolling. Due to usual scheduled updates, the application server is trying to push a PTT application update and a messaging application update to both members of the team. The server will identify that both devices are associated with members of a same team, and will push the PTT application update to be performed on one member's device and the messaging application on the other member's device. Therefore, while the update is being performed, the PTT application on at least one team-member's device is still accessible by at least one team member (similarly, for the messaging application).

In the above example, the team had two members, and N=1. Therefore, at least one member of the two-member team will have access to a critical application being updated. In larger teams, for example teams having 10 or more members, N may be larger. So for example, if N=5, at least five members of the ten-member team will have access to a critical application as it is being updated.

The following definitions are provided to set the necessary background for utilization of the preferred embodiment of the present invention.

Public-Safety Incident—An event or occurrence that involves first responders e.g., (police, fire, military, coastguard, . . . etc.). Such occurrences include, but are not limited to a fire, a crime, a weather-related event such as a lightning strike, an automobile accident, suspicious activity, graffiti, . . . , etc.

Public-Safety Incident Scene—A geographic area surrounding a public-safety incident.

Device—A preferably-mobile electronic platform that runs an application and stores data. Such electronic platforms include, but are not limited to a police radio, a laptop computer, a tablet computer, augmented-reality headsets, . . . , etc.

Application—Any program, software, or group of programs, or data that is designed for the end user. Applications include such things as database programs, maps, word processors, Web browsers and spreadsheets.

Computer Aided Dispatch Identification (CAD_ID)—Data utilized to classify and identify a type of incident. The CAD_ID may be input by an operator at dispatch center 114. The CAD_ID is input or generated for incidents where a public-safety officer is dispatched/assigned. This ID could be something as simple as a number, or something as complicated as an identification that is a function of populated fields, one of which may comprise an incident type.

With the above definitions in mind, team membership may be determined as those individuals:
- assigned to a same public-safety incident;
- located at a same public-safety incident scene;
- located in a same geographic area (e.g., within 10 feet of each other); and/or
- assigned to a same team within a database.

Turing now to the drawings wherein like numerals designate like components, FIG. 1 is a general operating environment 100 for the present invention. Environment 100 includes one or more radio access networks (RANs) 102, a public-safety core network 104, devices 110-112, dispatch center 114, and communication links 125, 118, 124. In a preferred embodiment of the present invention, dispatch center 114 serves as a public-safety dispatch center 114. Application server 107 provides updates to applications running on devices 110-112. It should be noted that the term "server" and "logic circuitry" can be used interchangeably, and simply mean circuitry that provides data so that devices 110-112 can update existing applications as described above.

Application server 107 is coupled to database 130. Database 130 comprises information necessary for application server 107 to appropriately determine device "owners" and their team membership. For example, database 130 may comprise officer information, officer locations, officer assignments, officer team membership, applications, . . . , etc. It should be noted that although only one application server 107 is shown coupled to database 130, there may exist many servers 107 providing update services to officers, with each application server 107 sharing database 130 (or a copy of database 130). For example, application servers 107 may exist within application stores in any incident-area network.

Communication between application server 107 and devices 110-112 takes place through an intervening network such as, but not limited to a high-speed data network 106 such as a cellular communication system. Thus, as shown in FIG. 1, two separate networks exist, namely public-safety core network 104 for carrying voice traffic from police radios, and a high-speed network 106 (e.g., Verizon, Spring, AT&T, . . . , etc.) for carrying application-update data.

Each RAN 102 includes typical RAN elements such as base stations, base station controllers (BSCs), routers, switches, and the like, arranged, connected, and programmed to provide wireless service to user equipment (e.g., devices 110-112) operated by officers 101-103) in a manner known to those of skill in the relevant art.

In a similar manner, network 106 includes elements such as base stations, base station controllers (BSCs), routers, switches, and the like, arranged, connected, and programmed to provide wireless service and data to user equipment (e.g., devices 110-112 operated by officers 101-103) in a manner known to those of skill in the relevant art.

The public-safety core network 104 may include one or more packet-switched networks and/or one or more circuit-switched networks, and in general provides one or more public-safety agencies with any necessary computing and communication needs, transmitting any necessary public-safety-related data and communications.

Devices 110-112 may be any suitable computing and/or communication devices configured to engage in wireless communication over an air interface as is known to those in the relevant art. Devices 110-112 comprises any device capable of running and updating an application. For example, officer devices 112 may comprise a mobile device running an Android™ or iOS™ operating system and having a GPS receiver capable of determining a location.

It should be noted that while only two officers 101-103 and two devices 108-110 are shown in FIG. 1, one of ordinary skill in the art will recognize that hundreds of officers and devices may actually exist in environment 100. Each officer will have their associated devices, and belong to a team. There may exist teams of one member, in which case no critical applications will be updated, since in a preferred embodiment N is a positive integer that is less than the number of team members.

During operation, device 108 is associated with officer 101 and device 110 is associated with officer 103. Each officer is assigned to a particular team (possibly the same team). When server 107 determines an application is to be updated on either device 108 or 110, the following steps occur:

- server 107 accesses database 130 to determine the public-safety officers associated with each device;
- server 107 determines team membership of the public-safety officers;
- server 107 determines whether or not updating the particular application on the devices will result in at least N team-member devices being able to access the particular application as it is being updated;
- If at least N team-members (e.g., N=1) are capable of accessing the particular application as it is being updated, then the application is updated by server 107.

Database 130 comprises officer's names, team membership, associated devices, current assignment, and locations. It should be noted that in alternate embodiments of the present invention database 130 may comprise more or fewer entries. This is illustrated in Table 1.

TABLE 1

| | Data existing within database 130 | | | | |
|---|---|---|---|---|---|
| Officer | Associated devices | Assigned incident | Location | Applications existing on associated devices | Partner(s) |
| Adams | Radio ID 10020030 | 0043212 | Lat 42 05' 35.14" Lon 88 18' 50.9" | PTT, Maps, spreadsheet, . . . | Zeller |
| Abrams | Radio 10023048 | None | Lat 42 05' 35.14" Lon 88 18' 50.9" | PTT, spreadsheet | Smith |
| . . . | . . . | . . . | . . . | | |
| Zeller | Tablet 0130284 | 001395 | Lat 42 06' 33.14" Lon 88 14' 50.9" | PTT, Maps, spreadsheet | Adams |

Figure 2:
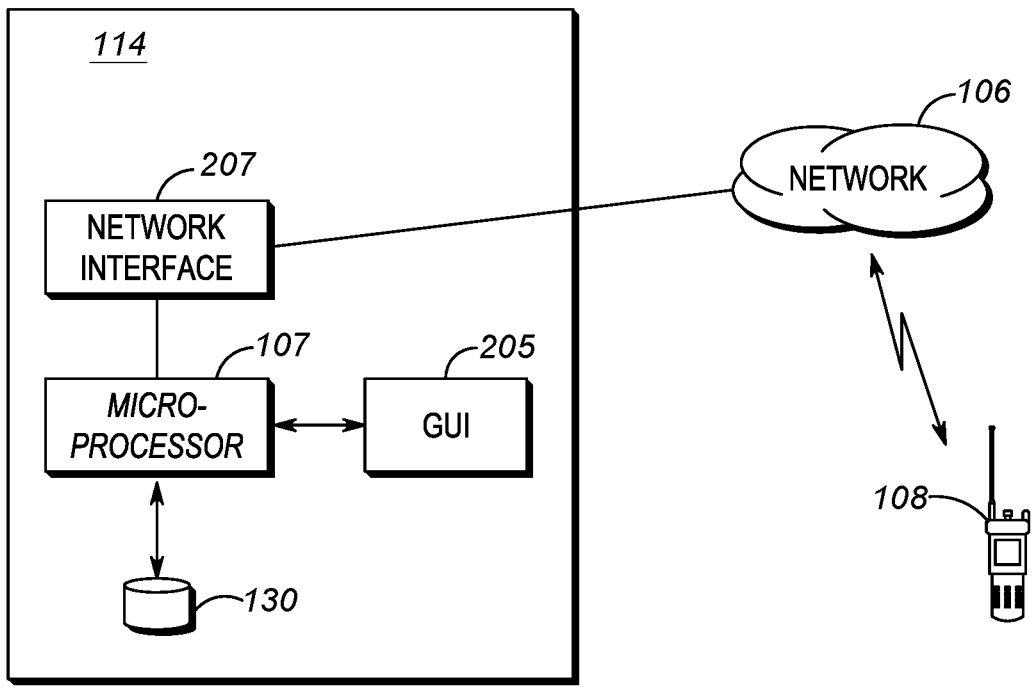
FIG. 2 is a block diagram of a dispatch center.

FIG. 2 is a block diagram of the dispatch center of FIG. 1. As shown, dispatch center 114 may include network interface 207, which may be wired or wireless. If wireless, network interface 207 comprises at least an over-the-air transmitter and a receiver. Dispatch center 114 also includes graphical-user interface (GUI) 205, logic circuitry 107, and databases 130. In other implementations, dispatch center 114 may include more, fewer, or different components.

Graphical-User Interface (GUI) 205 comprises a screen (e.g., a liquid crystal display (LCD), organic light-emitting diode (OLED) display, surface-conduction electro-emitter display (SED), plasma display, field emission display (FED), bistable display, projection display, laser projection, holographic display, etc.) that can display images, maps, incident data, . . . , etc. The input to GUI 205 may be input via a human operator from information obtained, for example, from a 911 emergency call. Such information may comprise information on an incident such as, but not limited to, a location of the incident, a severity of the incident, a type of incident, . . . , etc. In order to provide the above features (and additional features), GUI 205 may include a monitor, a keyboard, a mouse, and/or various other hardware components to provide a man/machine interface.

In one embodiment of the present invention, a computer-aided dispatch (CAD) incident identifier (ID) is utilized to classify a type of incident. The CAD_ID may be input by an operator at GUI 205. The CAD_ID is input or generated for incidents where a public-safety officer is dispatched. This ID could be something as simple as a number, or something as complicated as an identification that is a function of populated fields, one of which may comprise an incident type.

Logic circuitry 107 serves as application server 107 and comprises a digital signal processor (DSP), general purpose microprocessor, a programmable logic device, or application specific integrated circuit (ASIC) and is utilized to update applications as described above.

Databases 130 comprise standard random-access memory. As discussed above, database 130 comprises applications that are to be pushed to devices along with the information shown in Table 1.

In an illustrative embodiment, network 106 is attached (i.e., connected) to dispatch center 114 through network interface 207 and communicates with processor 107. Network 106 is connected via a wired or wireless connection to network interface 207. Network interface 207 includes elements including processing, modulating, and transceiver elements that are operable in accordance with any one or more standard or proprietary wired or wireless interfaces, wherein some of the functionality of the processing, modulating, and transceiver elements may be performed by means of processor 107.

In the illustrative embodiment, network 104 is attached (i.e., connected) to dispatch center 114 through a transmitter and receiver (not shown in FIG. 2), both of which communicate with processor 107. Network 104 is connected to dispatch center 114 via a wireless connection, although this connection may be wired in alternate embodiments.

In the illustrative embodiment, officer devices 112 are attached (i.e., connected) to application server 107 through network interface 207 and communicate with processor 107. Network interface 207 is configured to receive locations of devices 110-112, which are reported periodically as known in the art. Network interface 207 is also configured to forward updated applications to devices 110-112.

The dispatch center shown in FIG. 2 comprises a network interface, logic circuitry coupled to the network interface, the logic circuitry configured to determine if a device associated with a public-safety officer is in need of an application update, determine team members associated with the public-safety officer, and determine if at least N team members will have access to the application if the application is updated on the device, and update the device with the application only if at least N team members will have access to the application if the application is updated on the device. The network interface is also configured to transmit the application-update to the device. N is an integer greater than zero.

A database may be provided comprising information associating the public-safety officer to a team comprising the team members. The team members associated with the public-safety officer may comprise other officers identified within the database. The database may also comprise information associating the device to the public-safety officer.

The database may also comprise applications existing on the device.

The team members associated with the public-safety officer may comprise other officers co-located with the public-safety officer, other officers assigned to a same incident as the public-safety officer, and/or other officers at a same incident scene as the public-safety officer.

Figure 3:
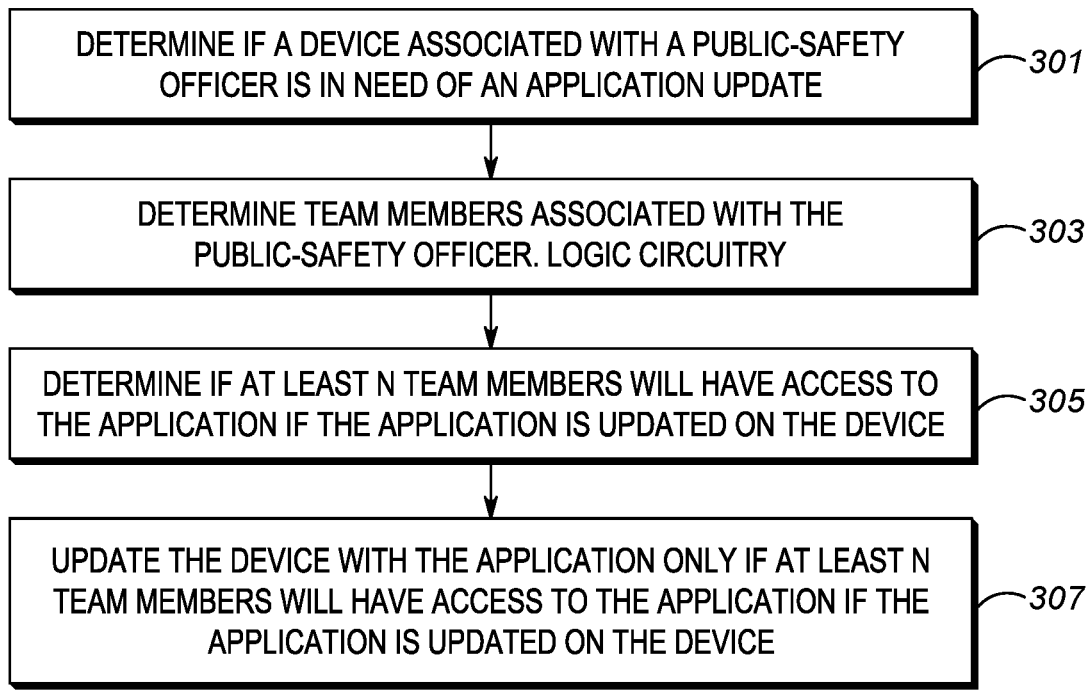
FIG. 3 is a flow chart showing the operation of updating applications.

FIG. 3 is a flow chart showing operation of dispatch center 114. The logic flow begins at step 301 where logic circuitry 107 determines if a device associated with a public-safety officer is in need of an application update. At step 303, logic circuitry 107 determines team members associated with the public-safety officer. Logic circuitry then determines if at least N team members will have access to the application if the application is updated on the device (step 305). Finally, logic circuitry 107 updates the device with the application only if at least N team members will have access to the application if the application is updated on the device (step 307).

As discussed above, the step of determining team members associated with the public-safety officer may comprise the step of determining other officers co-located with the public-safety officer. The step of determining team members associated with the public-safety officer may comprise the step of determining other officers assigned to a same incident as the public-safety officer. The step of determining team members associated with the public-safety officer may comprise the step of determining other officers at a same incident scene as the public-safety officer.

In the foregoing specification, specific embodiments have been described. However, one of ordinary skill in the art appreciates that various modifications and changes can be made without departing from the scope of the invention as set forth in the claims below. For example, although application server is shown existing within a dispatch center, the application server may exist as a stand-alone device, or in any other entity shown, or not shown in the figures. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a network interface;
   logic circuitry coupled to the network interface, the logic circuitry configured to determine if a device associated with a public-safety officer is in need of an application update, determine team members associated with the public-safety officer, and determine that at least N team members will have access to the application if the application is updated on the device, and update the device with the application update based on the fact that at least N team members will have access to the application if the application is updated on the device;
   wherein the network interface is also configured to transmit the application update to the device; and
   wherein N is an integer greater than zero.

2. The apparatus of claim 1 further comprising:
   a database comprising information associating the public-safety officer to a team comprising the team members.

3. The apparatus of claim 2 wherein the team members associated with the public-safety officer comprises other officers identified within the database.

4. The apparatus of claim 2 wherein the database also comprises information associating the device to the public-safety officer.

5. The apparatus of claim 4 wherein the database also comprises applications existing on the device.

6. The apparatus of claim 1 wherein the team members associated with the public-safety officer comprises other officers co-located with the public-safety officer.

7. The apparatus of claim 1 wherein the team members associated with the public-safety officer comprises other officers assigned to a same incident as the public-safety officer.

8. The apparatus of claim 1 wherein the team members associated with the public-safety officer comprises other officers at a same incident scene as the public-safety officer.

9. An apparatus comprising:
   a network interface;
   a database comprising information associating a public-safety officer to a team comprising team members;
   logic circuitry configured to determine if a device associated with the public-safety officer is in need of an application update, determine team members associated with the public-safety officer, and determine that at least N team members will have access to the application if the application is updated on the device, and update the device with the application update based on the fact that at least N team members will have access to the application if the application is updated on the device;
   wherein the network interface is also configured to transmit the application update to the device;
   wherein the team members associated with the public-safety officer comprises other officers co-located with the public-safety officer, other officers assigned to a same incident as the public-safety officer, identified within the database, and/or officers at a same incident scene as the public-safety officer; and
   wherein N is an integer greater than zero.

10. A method comprising the steps of:
    determining if a device associated with a public-safety officer is in need of an application update;
    determining team members associated with the public-safety officer;
    determine that at least N team members will have access to the application if the application is updated on the device; and
    updating the device with the application based on the fact that at least N team members will have access to the application if the application is updated on the device.

11. The method of claim 10 wherein the step of determining team members associated with the public-safety officer comprises the step of determining other officers co-located with the public-safety officer.

12. The method of claim 10 wherein the step of determining team members associated with the public-safety officer comprises the step of determining other officers assigned to a same incident as the public-safety officer.

13. The method of claim 10 wherein the step of determining team members associated with the public-safety officer comprises the step of determining other officers at a same incident scene as the public-safety officer.

* * * * *